Patented Feb. 9, 1932

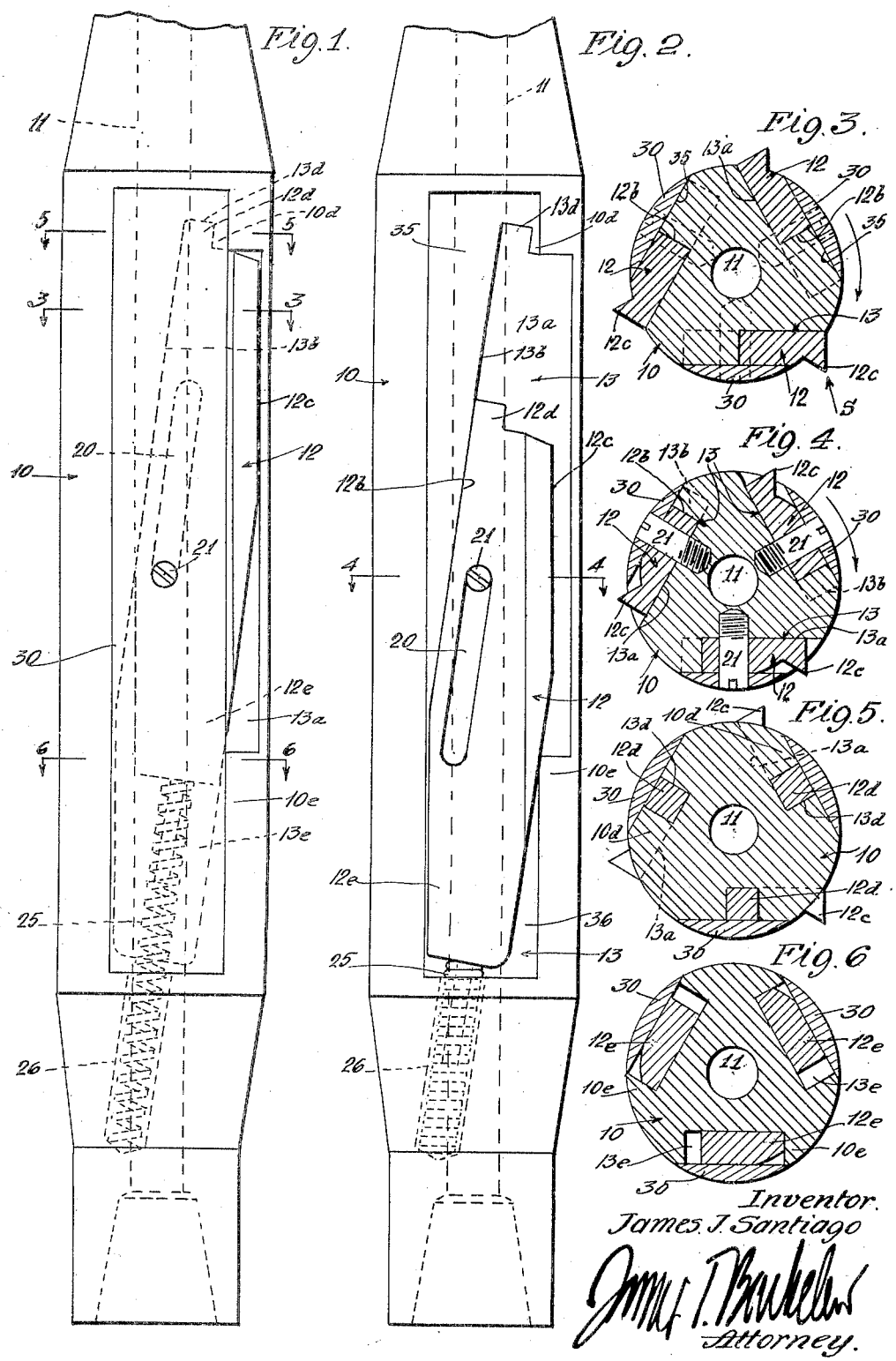

1,844,370

UNITED STATES PATENT OFFICE

JAMES J. SANTIAGO, OF LOS ANGELES, CALIFORNIA, ASSIGNOR TO JOHN GRANT, OF LOS ANGELES, CALIFORNIA

SHALE REAMER

Application filed December 5, 1928. Serial No. 323,844.

This invention has to do generally with reamers, and more particularly with expanding reamers, for well drilling. The particular embodiment of the invention shown in the accompanying drawings and hereinafter explained relates to a reamer having a comparatively small degree of expansion. It will be readily understood, however, that the invention, although particularly suited to use as a reamer with small expansion, or even as a non-expanding reamer, is not necessarily limited against use as an underreamer with a larger degree of expansion.

The invention as here illustrated has been designed, and is best structurally fitted, for reaming in shale and similar formations, using a cutting blade for that purpose. Although the design is best suited for that purpose, and the specific invention is directed more particularly to that end, the broader aspects of the invention are not necessarily limited to the provision of any specific or particular kind of cutting element on the cutter blades.

One of the characteristic features of the invention is in the provision of one or more cutter blades set in recesses in the body and preferably with the parts of the body welded around or over the blade or blades so as to cover them and hold them securely in place. In the design here shown the blades are completely enclosed within the solid body except for their cutting edges. Expansion is provided for by a diagonal sliding movement of the blade within the recess thus provided. In a reamer thus constructed, one of the outstanding characteristics is simplicity and ruggedness of structure, the reamer having but few parts, and none of those parts being small, and the stresses incident to reaming being taken directly and solidly from the blades to the body.

For the purpose of enabling my invention to be understood by those skilled in this art I now proceed to a detailed description of the present specific and illustrative form and embodiment of the invention, reference for this purpose being had to the accompanying drawings in which Figure 1 is a side elevation of the reamer showing a blade in expanded position.

Fig. 2 is a view in the same aspect as Figure 1 but with the blade cover plate removed.

Fig. 3 is a cross section on line 3—3 of Fig. 1.

Fig. 4 is a cross section on line 4—4 of Fig. 2, and

Figs. 5 and 6 are cross sections on lines 5—5 and 6—6 respectively of Fig. 1.

In the drawings a cylindric body is shown at 10, preferably solid with the exception of the longitudinal circulation bore 11 and the cutter-receiving recesses. The number of cutters, and therefore the number of cutter-receiving recesses, may be selected as desired; in this particular case I have chosen to show three. Thus three cutter blades are shown at 12, each blade being housed in a body recess 13. The cutter blades may be described as being flat and rather elongated blades; and the recesses are of corresponding configuration. Each recess has a flat inner wall surface 13a which lies in a plane tangential to the central vertical axis of the tool. The rear or back wall surface of each recess, which is best illustrated in Figure 2 at 13b, extends diagonally with respect to the central vertical axis of the tool, so that when the cutter blade 12 slides upwardly in the recess, with its rear diagonal surface 12b bearing against wall 13b, the cutter is moved outwardly from the retracted position of Figure 2 to the expanded position of Figure 1. The cutting element of the blade, here illustrated as a cutting edge 12c, is located on the outer vertical edge of the blade substantially opposite the rear bearing surface 12b of the blade; so that horizontal thrusts on the cutting edge in the direction of the plane of the blade are transmitted directly through the blade to the rear bearing wall 13b of the body recess.

The upper end of the blade has an extension or lug 12d which enters a notch 13d at the upper end of the recess when the blade is in its uppermost or expanded position. A part 10d of the body overhangs this notch 13d, and thus the upper end of the blade is held from being torn out of the body. Also, when the blade is in its upper expanded position, the lower end portion 12e of the blade still projects into the lower part 13e of the recess; this lower recess part being overhung by part 10e of the body to prevent the lower end of the blade being torn out of the body. Also, to guide the blade during its movement from the position of Figure 2 to the position of Figure 1, and to prevent its tilting out of the recess during such movement, the blade may preferably be provided with a slot 20 parallel to the blade bearing surface 12b, and a screw or stud 21 extends through that slot and into the body. A compression spring 25, seated at its lower end in a spring recess 26 acts to move the blade upwardly to the position of Figure 1.

In the manufacture and assembly of this reamer, and when the several parts have been assembled to the point shown in Figure 2, then a recess cover plate 30 is placed over each recess and blade and is welded into place. This cover plate is preferably rectangular in its aspect in elevation as shown in Figure 1, and segmental shaped in section as shown in the sectional views. These cover plates are preferably welded into place. When placed upon the body they bear upon the body surfaces indicate at 35 and 36 (for 36 see the lower part of Figure 2) and are preferably welded to the body throughout the extent of, or completely around, those surfaces. When the cover plates are thus welded on they cover all parts of the blade recesses except the recess openings through which the cutting edges 12c projects. The finished recesses may be described as flat recesses, or slots, which have openings or mouths of lesser extent than the recess length; a recess entirely enclosed except for its restricted mouth. And, when the cover plates are welded on, they become in effect integral with the body. Particularly are the cover plates strongly joined with the body at the upper parts of the plates which cover the upper or cutting parts of the blades. For instance, in the section of Figure 3 it will be seen that the surface 35 is quite broad. Rotary reaming stresses applied to the cutting edges of the blades are typically in a direction lying between a tangential and a radial direction. The arrow S in Figure 3 gives a typical indication. The forces thus applied to the blade are transmitted directly to the back wall surface 13a of the recess. The tendency to twist the blade is very small because of the blade being directly backed up by the body surface 13a. If, under any circumstances, the force indicated at S should be more nearly tangential than indicated, there of course would then be some tendency to pull the blade out of its recess; but this tendency is resisted by the overhanging parts 10d and 10e of the body. Under the same circumstances, there may be a tendency to twist or rotate the blade in the body, forcing its rear edge parts outwardly against the cover plate 30; but the solid and strong juncture of the cover plate with the body is ample to resist any such forces.

I claim:

1. A reamer of the character described, comprising an elongate body rotatable about a longitudinal axis, the body having a longitudinally elongate recess which extends into the body in a plane tangential to a circle concentric with the body axis, said recess being entirely enclosed within the body except for a restricted blade protrusion opening which is of lesser longitudinal extent than the recess and a blade-like cutter in the recess having a cutting edge extensible through the opening.

2. A reamer of the character described, comprising a cylindric and substantially solid body, rotatable about a longitudinal axis, the body having a longitudinally elongate and flat recess which extends into the body in a plane tangential to a circle concentric with the body axis, the rear wall of the recess extending diagonally to the longitudinal body axis, said recess being entirely enclosed within the body except for a restricted mouth which opens, at the cylindric surface of the body and which is of lesser longitudinal extent than the recess, a blade-like cutter in the recess and having a diagonal rear edge surface bearing back against the said diagonal recess surface, said blade being longitudinally slidable in the recess and having a cutting edge projectible through the restricted mouth.

3. A reamer of the character described, comprising a substantially cylindric body rotatable about a longitudinal axis, the body having a longitudinally elongate recess which extends into the body in a plane tangential to a circle concentric with the body axis, the rear wall of said recess extending diagonally to the longitudinal body axis, a blade like cutter in the recess and having a diagonal rear edge surface adapted to bear back against the said diagonal back surface of the recess, and said blade being longitudinally slidable in the recess, the body having recess overhanging portions at top and bottom of the recess which serve to restrict the opening or mouth of the recess, and the cutter having upper and lower end parts which engage behind said overhanging portions to prevent outward removal of the cutter through the mouth or opening of the recess.

4. An expanding reamer of the character described comprising a substantially cylindric body rotatable about a longitudinal axis, a longitudinally elongated recess extending into the body in a plane tangential to a circle concentric with said longitudinal axis and ending in a rear wall which is diagonal to said longitudinal axis, the inner parts of said recess being of greater longitudinal extent than the opening or mouth of said recess at the surface of the body, so as to provide upper and lower overhanging parts of the body above and below the mouth of the recess, a blade-like cutter mounted in said body recess and slidable vertically therein, the cutter blade having a diagonal rear edge surface which bears back flatly against the rear wall surface of the recess, a spring under the cutter tending to move it upwardly and the cutter having upper and lower end parts adapted to lie in the upper and lower part of the recess behind said overhanging parts of the body.

5. An expanding reamer of the character described comprising a substantially cylindric body rotatable about a longitudinal axis, a longitudinally elongated recess extending into the body in a plane tangential to a circle concentric with said longitudinal axis and ending in a rear wall which is diagonal to said longitudinal axis, the inner parts of said recess being of greater longitudinal extent than the opening or mouth of said recess at the surface of the body, so as to provide upper and lower overhanging parts of the body above and below the mouth of the recess, a blade-like cutter mounted in said body recess and slidable vertically therein, the cutter blade having a diagonal rear edge surface which bears back flatly against the rear wall surface of the recess, a spring under the cutter tending to move it upwardly, and the cutter having upper and lower end parts adapted to lie in the upper and lower part of the recess behind said overhanging parts of the body, the cutter also having a slot therethrough which extends in a direction parallel to its rear edge surface, and a guide pin mounted in the body and extending transversely through said slot.

6. In a reamer of the character described, a substantially cylindric body rotatable about a longitudinal axis, said body having therein a cutter receiving recess which extends into the body in a plane tangential to a circle concentric with said longitudinal axis, said recess being entirely enclosed within the body except for an opening or mouth in said tangential plane, and a cutter blade mounted in the recess and movable diagonally therein to project a longitudinal cutting edge through the recess mouth, said cutter being, except for its projected longitudinal edge, entirely within the recess.

7. An expanding reamer of the character described, comprising a substantially cylindric body rotatable about a longitudinal axis, said body having therein a cutter receiving recess which extends into the body from its periphery in a plane tangential to a circle concentric with said longitudinal axis, said axis being entirely enclosed within the body except for a front opening at the periphery of the body, the recess having substantially parallel side walls, being elongated longitudinally of the body, and having its rear wall diagonal to the body axis, and a flat cutter blade mounted in the recess, bearing against its substantially parallel side walls and against its diagonal back wall, and movable diagonally along said back wall to project a longitudinal cutting edge through the recess mouth, said cutter being, except for its projected longitudinal edge, entirely within the recess.

In witness that I claim the foregoing I have hereunto subscribed my name this 27th day of November, 1928.

JAMES J. SANTIAGO.